(12) United States Patent
Wiegman

(10) Patent No.: US 11,850,965 B2
(45) Date of Patent: Dec. 26, 2023

(54) METHODS AND SYSTEMS FOR AN ELECTRIC VEHICLE CHARGING CONNECTOR

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/515,506

(22) Filed: Oct. 31, 2021

(65) Prior Publication Data

US 2023/0135055 A1    May 4, 2023

(51) Int. Cl.
| | | |
|---|---|---|
| *B60L 53/60* | (2019.01) | |
| *H02J 7/00* | (2006.01) | |
| *B60L 53/16* | (2019.01) | |
| *B64F 1/36* | (2017.01) | |

(52) U.S. Cl.
CPC ............... *B60L 53/60* (2019.02); *B60L 53/16* (2019.02); *B64F 1/362* (2013.01); *H02J 7/0036* (2013.01); *H02J 7/0042* (2013.01); *B60L 2200/10* (2013.01)

(58) Field of Classification Search
CPC ........ B60L 53/60; H02J 7/0036; H02J 7/0042
USPC ........................................................... 320/111
See application file for complete search history.

(56) References Cited

U.S. PATENT DOCUMENTS

| | | |
|---|---|---|
| 7,839,019 B2 | 11/2010 | Chang |
| 7,988,453 B2 | 8/2011 | Loo et al. |
| 8,698,451 B2 | 4/2014 | King et al. |
| 8,890,474 B2 | 11/2014 | Kim et al. |
| 9,073,446 B2 | 7/2015 | Hani et al. |
| 9,233,618 B2 | 1/2016 | Dyer et al. |
| 9,278,624 B2 | 3/2016 | Kinomura et al. |
| 9,484,749 B2 | 11/2016 | Brombach et al. |
| 9,533,588 B2 | 1/2017 | Sadano et al. |
| 9,630,513 B2 | 4/2017 | Fietzek et al. |
| 9,673,564 B2 | 6/2017 | Feldner |
| 10,274,532 B1* | 4/2019 | Smith ................... B60R 16/03 |
| 10,414,278 B2 | 9/2019 | Marcos Moreira Da Silva et al. |
| 10,442,301 B2 | 10/2019 | Gerber et al. |

(Continued)

FOREIGN PATENT DOCUMENTS

| | | |
|---|---|---|
| DE | 102019122427 A1 | 2/2021 |
| WO | 2018060153 | 4/2018 |
| WO | 2020114888 | 6/2020 |

OTHER PUBLICATIONS

Joshua Portlock, Solving the Aircraft Charging Problem: SAE International AS6968 Standard, Sep. 25, 2020.
Bryce Gaton, What is CCS charging?, Dec. 10, 2018.

*Primary Examiner* — Suchin Parihar
(74) *Attorney, Agent, or Firm* — CALDWELL INTELLECTUAL PROPERTY LAW

(57) ABSTRACT

An electric vehicle charging connector including a charging connector. The charging connector including a direct current pin and an alternating current pin. The electric vehicle charging connector also including a coupling mechanism configured to: couple the charging connector to an electric vehicle, enable a flow of electricity from the charging connector to the electric vehicle, and disable the flow of electricity from the charging connector to the electric vehicle.

20 Claims, 6 Drawing Sheets

(56) References Cited

U.S. PATENT DOCUMENTS

| | | | |
|---|---|---|---|
| 10,950,974 B2 | 3/2021 | Schreiber et al. | |
| 11,390,178 B1 * | 7/2022 | Wiegman | B60L 53/66 |
| 11,390,181 B1 * | 7/2022 | Clark | G01R 31/088 |
| 2012/0249070 A1 * | 10/2012 | Sellner | B60L 3/0069 |
| | | | 320/109 |
| 2013/0214738 A1 * | 8/2013 | Chen | B60L 58/13 |
| | | | 320/109 |
| 2013/0321024 A1 * | 12/2013 | Muller | B60L 53/52 |
| | | | 324/764.01 |
| 2014/0211345 A1 * | 7/2014 | Thompson | B60L 53/665 |
| | | | 335/11 |
| 2016/0036256 A1 * | 2/2016 | Sukup | H02J 7/00 |
| | | | 320/107 |
| 2016/0144728 A1 * | 5/2016 | Harper | B60L 53/67 |
| | | | 320/109 |
| 2020/0298722 A1 * | 9/2020 | Smolenaers | H02J 7/345 |
| 2022/0001762 A1 * | 1/2022 | Farkas | H02J 7/0045 |
| 2022/0048396 A1 * | 2/2022 | Liu | B60L 53/16 |
| 2022/0161676 A1 * | 5/2022 | Marlow | B60L 53/16 |

* cited by examiner

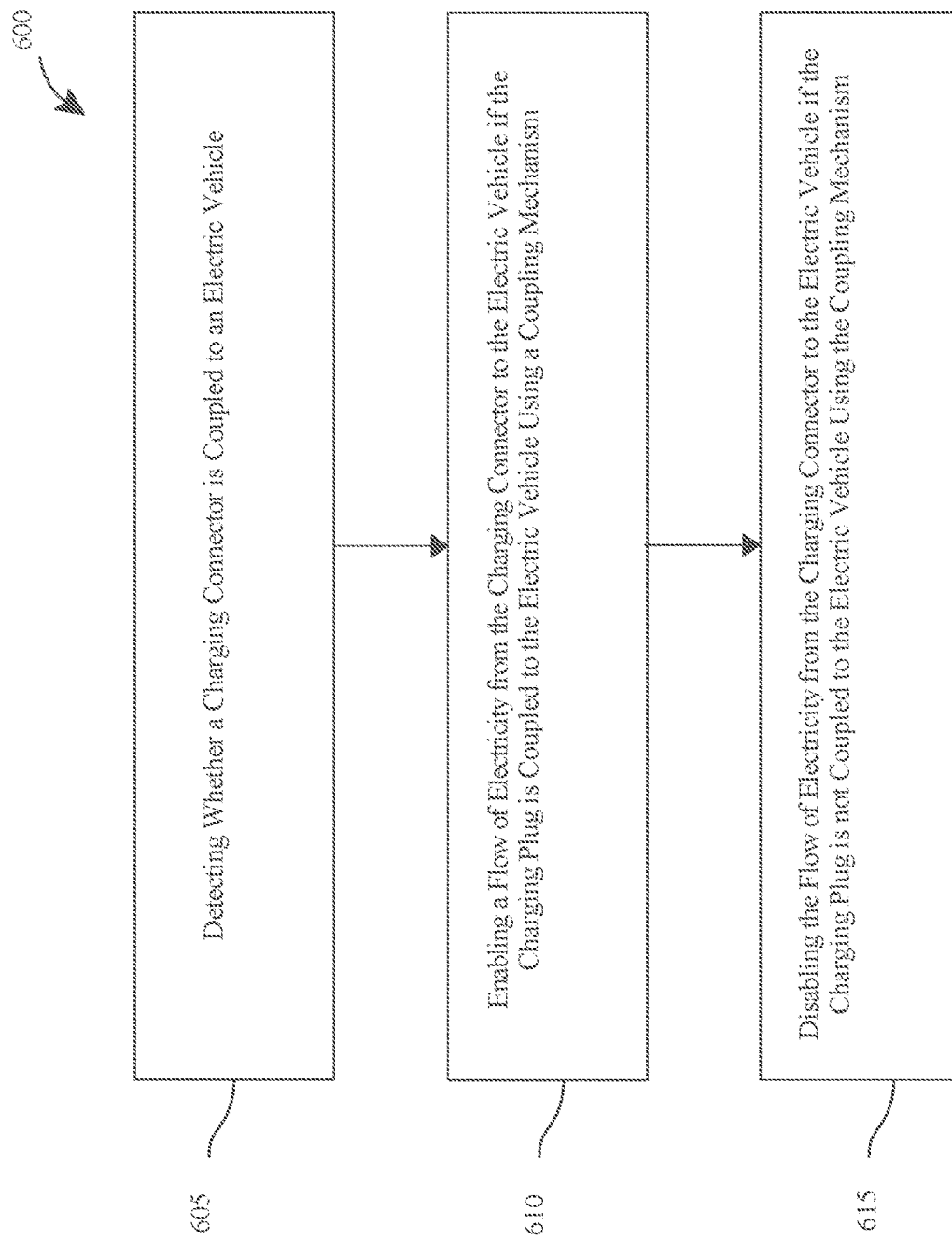

METHODS AND SYSTEMS FOR AN ELECTRIC VEHICLE CHARGING CONNECTOR

FIELD OF THE INVENTION

The present invention generally relates to the field of electric vehicle chargers. In particular, the present invention is directed to methods and systems for an electric vehicle charging connector.

BACKGROUND

In the field of electric vehicle chargers, there exists a need to ensure that electricity does not flow from a charging connector, unless it is coupled to an electric vehicle. This helps prevent electrocution of those operating the electric vehicle charger. Additionally, it may help prevent other hazards associated with live electrical contacts being exposed to users. In general, there is a need for greater safety in electric vehicle chargers. Existing solutions for this problem do not resolve this issue in a satisfactory manner.

SUMMARY OF THE DISCLOSURE

In an aspect an electric vehicle charging connector, including a charging connector. The charging connector including a direct current pin and an alternating current pin. The electric vehicle charging connector additionally including a coupling mechanism, the coupling mechanism configured to: couple the charging connector to an electric vehicle, enable a flow of electricity from the charging connector to the electric vehicle when the charging connector becomes coupled to the electric vehicle, and disable the flow of electricity from the charging connector to the electric vehicle when the charging connector becomes uncoupled from the electric vehicle.

In another aspect, a method for an electric vehicle charging connector, including detecting whether a charging connector is coupled to an electric vehicle, enabling a flow of electricity from the charging connector to the electric vehicle if the charging plug is coupled to the electric vehicle using a coupling mechanism, and disabling the flow of electricity from the charging connector to the electric vehicle if the charging plug is not coupled to the electric vehicle using the coupling mechanism.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is flow chart of an embodiment of a method for an electric vehicle charging connector.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an electric vehicle charging connector. In an embodiment, a coupling mechanism enables and disables the flow of electricity from a charging connector to an electric vehicle depending on whether the charging connector is coupled to an electric vehicle.

Aspects of the present disclosure can be used to prevent harm to users of an electric vehicle charger by preventing electrocution. This is so, at least in part, because, consistent with aspects of the present disclosure, charging connector may not have power flowing from it when charging connector is not coupled to an electric vehicle. Exemplary embodiments illustrating aspects of the present disclosure are described below in the context of several specific examples.

Figure 1:
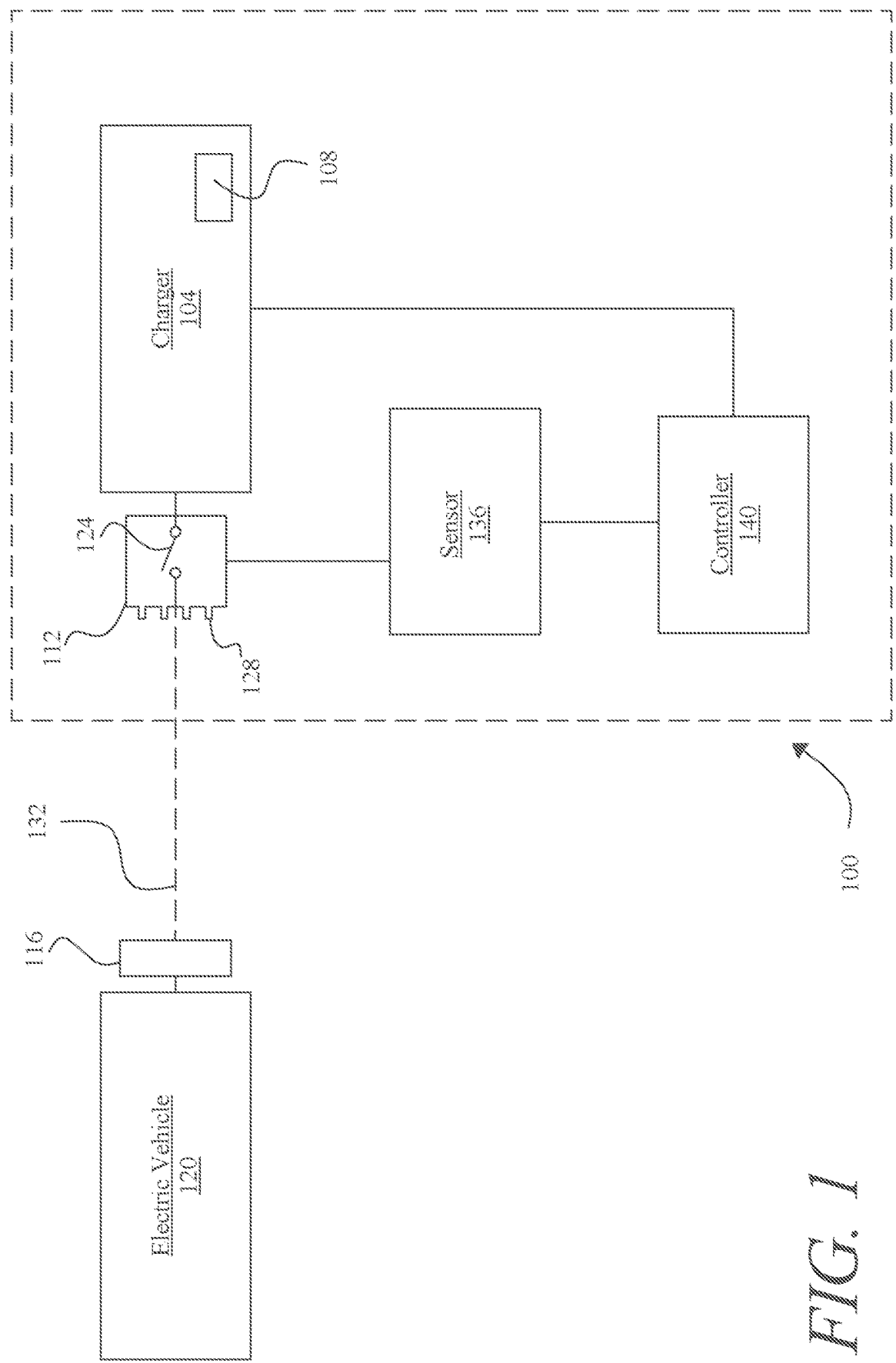
FIG. 1 is a diagram of an embodiment of a charging system including a coupling mechanism.

Referring to FIG. 1, charging system 100 includes a charger 104. Charger 104 includes a power source 108. In some embodiments, power source 108 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, power source 108 need not be made up of only a single electrochemical cell, it can consist of several electrochemical cells wired in series or in parallel. In other embodiments, power source 108 may be a connection to the power grid. For example, in some non-limiting embodiments, power source 108 may include a connection to a grid power component. Grid power component may be connected to an external electrical power grid. In some other embodiments, the external power grid may be used to charge batteries, for example, when power source 108 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Charger 104 may be consistent with the charger disclosed in U.S. application Ser. No. 17/477,987 filed on Sep. 17, 2021, titled "Systems and Methods for Adaptive Electric Vehicle reference. Additionally, charger 104 may be consistent with the charger disclosed in U.S. application Ser. No. 17/515,448 filed on Oct. 31, 2021, titled "Systems and Methods for an Immediate Shutdown of an Electric Vehicle Charger," the entirety of which is hereby incorporated by reference. In some embodiments, charger 104 may draw power from the power grid to be used for charging without being stored in a battery. For example, charger 104 may include a ventilation component configured to lead a flow of air and/or airborne particles away from charger 104 and/or electric vehicle 120. In some embodiments, ventilation component may include a ventilation ducting system. A "ventilation component" as used in this disclosure is a group of holes configured to permit a flow of air away or towards an object. In some embodiments, a ventilation ducting system may be configured to direct a flow of heated air away from charger 104. In other embodiments, a ventilation ducting system may be configured to direct a flow of cool air to charger 104. In some embodiments, ventilation component may include a plurality of exhaust devices, such as, but not limited to, vanes, blades, rotors, impellers, and the like. In some embodiments, an exhaust device of ventilation component may be mechanically connected to a power source. In one or more embodiments, ventilation component may have a charging connection with electric vehicle 120. In one or more exemplary embodiments, if controller 140 determines a disruption element related to the communication between ventilation component and vehicle 120 as a function of, for example, temperature charging datum, then controller 140 may disable charging connection between ventilation component and electric vehicle 120 to avoid, for example, overheating of charger 104 and/or electric vehicle if ventilation component is working improperly.

With continued reference to FIG. 1, charger 104 is electrically connected to charging connector 112. Charging connector 112 may include a variety of pins adapted to mate with a charging port 116 disposed on electric vehicle 120. Charging connector 112 includes a coupling mechanism 124. Coupling mechanism 124 has an enabled state and a disenabled state. For the purposes of this disclosure, charging connector 112 and charging port 116 are "coupled" when they are connected together to form an electrical connection. In FIG. 1, coupling mechanism is depicted as a switch disposed inside charging connector 112; however, coupling mechanism may take a variety of forms. Coupling mechanism 124 may include any device configured to allow current flow in one state and disallow current flow in another state. As a non-limiting example, coupling mechanism 124 may be a relay. A relay is an electrically and/or electromechanically operated switch that can receive control signals. A relay can be enabled or disenabled by the control signals. In an embodiment, coupling mechanism 124 may receive control signals from a controller 140, for example. A relay need not have any moving parts and can be solid state. As another non-limiting example, coupling mechanism 124 may be a mechanical switch. In an embodiment, where coupling mechanism 124 is a mechanical switch, the coupling of charging connector 112 to charging port 116 may cause charging connector 112 to be actuated, so as switch coupling mechanism 124 into its enabled state. In an embodiment, where coupling mechanism 124 is a mechanical switch, the decoupling of charging connector 112 from charging port 116 may cause charging connector 112 to be actuated, so as switch coupling mechanism 124 into its disenabled state. In some embodiments, the charging connector 112 may include a mating device 128. In some embodiments, mating device 128 may be a pin, adapted to mate with a socket in charging port 116 on electric vehicle 120. Charging connector may include other pins such as an alternating current (AC) pin, a direct current (DC) pin, or a ground pin. In some embodiments, charging connector 112 or charging port 116 may include a locking mechanism. The locking mechanism may keep charging connector 112 engaged with charging port 116. Charging connector 112 may form a charging connection 132 with charging port 116 when charging connector 112 is engaged with charging port 116. Charging connection 132 is an electrical connection. Coupling mechanism 124 switches to its enabled state when charging connector 112 becomes coupled to charging port 116 or to electric vehicle 120. Coupling mechanism 124 switches to its disabled state when charging connector 112 becomes uncoupled from charging port 116 or from electric vehicle 120.

With continued reference to FIG. 1, charging system 100 may include a sensor 136. Sensor 136 may be electrically or communicatively connected to charging connector 112. "Communicatively connected," for the purpose of this disclosure, means connected such that data can be transmitted, whether wirelessly or wired. In some embodiments sensor 136 may be electrically or communicatively connected to coupling mechanism 124, charger 104, and/or mating device 128. In some embodiments, sensor 136 is configured to detect whether charging connector 112 is coupled to charging port 116 as a function of mating device 128. In some embodiments, sensor 136 may be configured to detect a coupling datum. For the purposes of this disclosure, "coupling datum" is an element of information regarding whether charging connector 112 and charging port 116 are coupled. In some embodiments, sensor 136 may be an electrical sensor. As a non-limiting example, sensor 136 may be a continuity sensor. A continuity sensor is a sensor that measures whether an electrical path between two points. In this embodiment, for example, the continuity sensor could measure whether a pin, for example mating device 128 when mating device 128 is a pin, on charging connector 112 is part of an electrical path. In this embodiment, if the continuity sensor detects that there is no continuity, then this may indicate that charging port 116 is not coupled to charging connector 112. Alternatively, in other embodiments, sensor 136 may be an ammeter that measures the current through a pin on charging connector 112. In this embodiment, the absence of current may indicate that charging connector 112 is coupled to charging port 116, whereas the presence of current may indicate that charging port 116 is coupled to charging connector 112. In other embodiments, sensor 136 may be another type of electrical sensor such as, for example, a voltmeter or ohmmeter. For the purposes of this disclosure, "electrical sensor" means a sensor that measures an electrical property such as current, resistance, capacitance, impedance, voltage, and the like. In some embodiments, sensor 136 may be an electromagnetic effect sensor, such as, for example a Hall effect sensor. Broadly, a Hall effect sensor measures the difference in voltage across a conductor due to a magnetic field. In some embodiments, sensor 136 may be a contact sensor. "Contact sensor," for the purposes of this disclosure, means a sensor that senses physical contact between two surfaces or points. As a non-limiting example, in this embodiment, a contact sensor may detect contact between a face of charging port 116 and charging connector 112. In this embodiment, the detection of contact would mean that charging port 116 and charging connector 112 may be coupled, whereas the absence of the detection of contact would mean that charging port 116 and charging connector 112 may not be coupled. As a non-limiting example, sensor 136 may be force-sensing resistor, where the resistance of the resistor changes when a force, pressure, or mechanical stress is applied. In some embodiments, sensor 136 may be a time-of-flight sensor. A time-of-flight sensor measure the time between the emission of a signal and its return to the time-of-flight sensor in order to measure the distance between the time-of-flight sensor and an object. In other words, the signal will take longer to traverse the distance between the time-of-flight sensor and the object, and then return to the time-of-flight sensor, if the object is far away from the time-of-flight sensor. A time-of-flight sensor may use various different signals in order to conduct its measurements. For instance, a time-of-flight sensor may use ultrasound, infrared light, or a laser as a signal. One of ordinary skill in the art would appreciate that, after reviewing this disclosure in its entirety, a variety of sensors may be used as sensor 136.

With continued reference to FIG. 1, sensor 136 may be part of a sensor suite. Sensor suite may include a sensor or plurality thereof that may detect voltage, current, resistance, capacitance, temperature, or inductance; detection may be performed using any suitable component, set of components, and/or mechanism for direct or indirect measurement, including without limitation comparators, analog to digital converters, any form of voltmeter, or the like. Sensor suite may include digital sensors, analog sensors, or a combination thereof. Sensor suite may include digital-to-analog converters (DAC), analog-to-digital converters (ADC, A/D, A-to-D), a combination thereof, or other signal conditioning components used in transmission of a resistance datum over wired or wireless connection.

With continued reference to FIG. 1, Sensor suite may measure an electrical property at an instant, over a period of time, or periodically. Sensor suite may be configured to operate at any of these detection modes, switch between modes, or simultaneous measure in more than one mode.

With continued reference to FIG. 1, sensor suite may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite, may be measured in Fahrenheit (° F.), Celsius (° C.), Kelvin (° K), or another scale alone or in combination. The temperature measured by sensors may comprise electrical signals which are transmitted to their appropriate destination through a wireless or wired connection.

With continued reference to FIG. 1, charging system 100 may include a controller 140. Controller may be communicatively connected to sensor 136. In some embodiments, controller 140 may be communicatively connected to charger 104. In some embodiments, controller 140 may be communicatively connected to coupling mechanism 124. In some embodiments, controller 140 may receive a measurement from sensor 136 indicating that the charging connector 112 and charging port 116 are coupled. In some embodiments, controller 140 may receive a charging datum from sensor 136. In some embodiments, in response to the measurement or charging datum, controller may send a command to coupling mechanism 124 for coupling mechanism 124 to enter its enabled state. In some embodiments, controller 140 may receive a measurement from sensor 136 indicating that the charging connector 112 and charging port 116 are not coupled. In response, in some embodiments, controller may send a command to coupling mechanism 124 for coupling mechanism 124 to enter its disabled state.

With continued reference to FIG. 1, in some embodiments, controller 140 may be implemented using an analog circuit. For example, in some embodiments, controller 140 may be implemented using an analog circuit using operational amplifiers, comparators, transistors, or the like. In some embodiments, controller 140 may be implemented using a digital circuit having one or more logic gates. In some embodiments, controller may be implemented using a combinational logic circuit, a synchronous logic circuit, an asynchronous logic circuit, or the like. In other embodiments, controller 140 may be implemented using an application specific integrated circuit (ASIC). In yet other embodiments, controller 140 may be implemented using a field programmable gate array (FPGA) and the like.

With continued reference to FIG. 1, in some embodiments, controller 140 may be a computing device, flight controller, processor, control circuit, or the like. With continued reference to FIG. 1, controller 140 may include any computing device as described in this disclosure, including without limitation a microcontroller, microprocessor, digital signal processor (DSP) and/or system on a chip (SoC) as described in this disclosure. Controller 140 may be an analog circuit such as a circuit including one or more operational amplifiers and/or comparators, and/or could include a logic circuit, which may be a combinatorial logic circuit and/or a sequential logic circuit. Computing device may include, be included in, and/or communicate with a mobile device such as a mobile telephone or smartphone. controller 140 may include a single computing device operating independently, or may include two or more computing device operating in concert, in parallel, sequentially or the like; two or more computing devices may be included together in a single computing device or in two or more computing devices. controller 140 may interface or communicate with one or more additional devices as described below in further detail via a network interface device. Network interface device may be utilized for connecting controller 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 140 may include but is not limited to, for example, a computing device or cluster of computing devices in a first location and a second computing device or cluster of computing devices in a second location. controller 140 may include one or more computing devices dedicated to data storage, security, distribution of traffic for load balancing, and the like. controller 140 may distribute one or more computing tasks as described below across a plurality of computing devices of computing device, which may operate in parallel, in series, redundantly, or in any other manner used for distribution of tasks or memory between computing devices.

With continued reference to FIG. 1, controller 140 may be configured to perform any method, method step, or sequence of method steps in any embodiment described in this disclosure, in any order and with any degree of repetition. For instance, controller 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
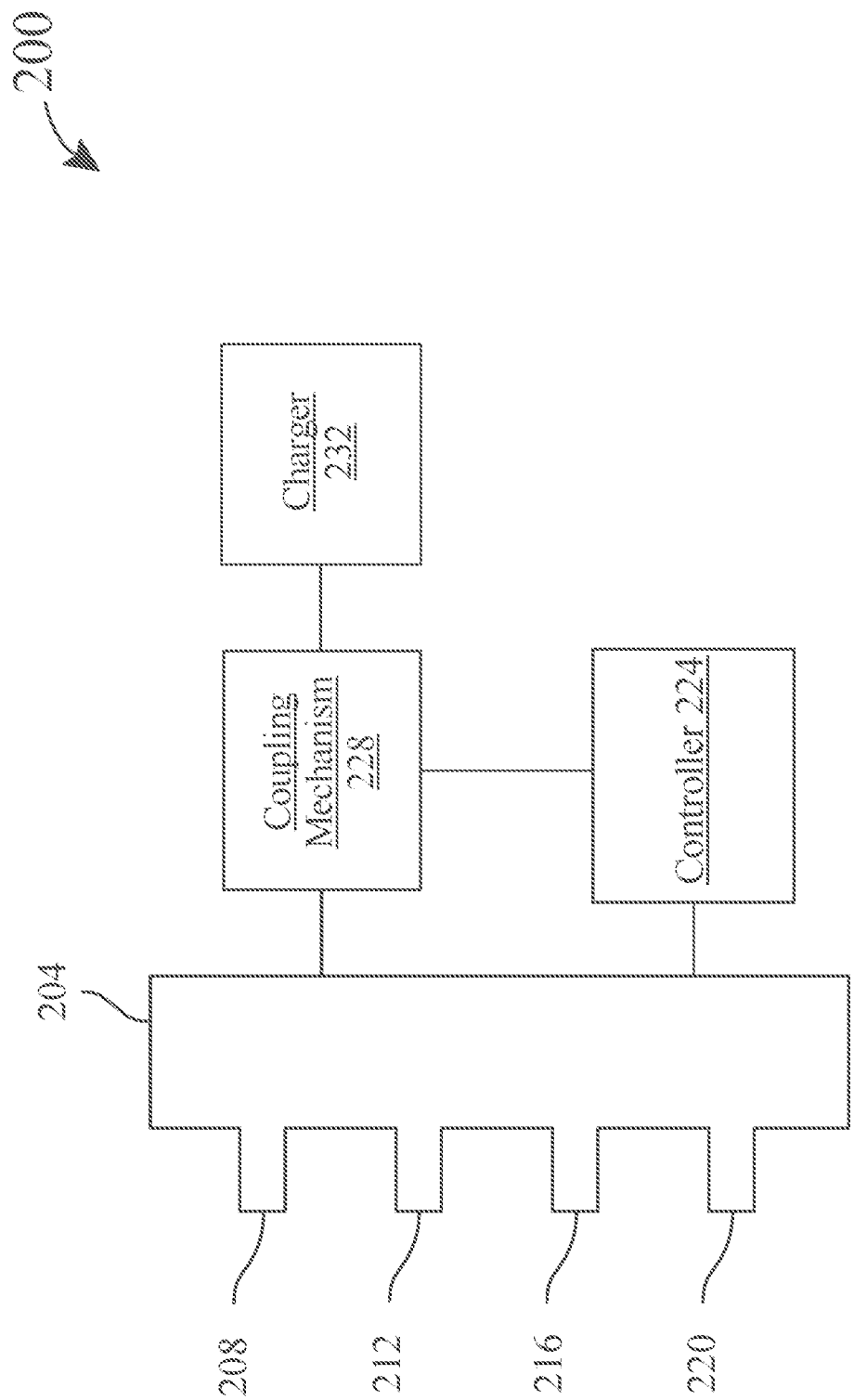
FIG. 2 is a block diagram of an embodiment of an electric charging system.

Referring now to FIG. 2, an embodiment of electric charging system 200 is depicted. Electric charging system 200 includes a charging connector 204. Charging connector 204 may include an AC pin 208, a DC pin 212, a ground pin 216, and/or a communication pin 220. In some embodiments, AC pin 208, a DC pin 212, a ground pin 216, and/or a communication pin 220 may be disposed on the face of charging connector 204. For the purposes of this disclosure, the "face" of charging connector 204 is the side of charging connector 204 that is adapted to mate with a charging port (e.g. charging port 116 in FIG. 1).

With continued reference to FIG. 2, AC pin 208 carries AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power.

With continued reference to FIG. 2, DC pin 212 carries DC power. DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 2, ground pin 216 may provide a connection to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 2, charging connector 204 may include a communication pin 220. Communication pin 220 may transmit signals between an electric vehicle and controller 224. Communication pin 220 may be electrically or communicatively connected to controller 224. Controller 224 may be electrically or communicatively connected to coupling mechanism 228. In some embodiments, communication pin 220 may receive a coupling signal from an electric vehicle to signify that charging connector 204 and a charging port or an electric vehicle have coupled. In these embodiments, controller 224 may receive the coupling signal from communication pin 220 and send a command to coupling mechanism 228 to enter its enabled state. In some embodiments, communication pin 220 may receive a decoupling signal from an electric vehicle to signify that charging of the electric vehicle has completed, or that decoupling of charging connector 204 and a charging port is about to take place. In these embodiments, controller 224 may receive the decoupling signal from communication pin 220 and send a command to coupling mechanism 228 to enter its disabled state. Coupling mechanism 228 may be consistent with any coupling mechanism disclosed as part of this disclosure.

Controller 224 may be consistent with any controller disclosed as part of this disclosure.

With continued reference to FIG. 2, coupling mechanism 228 is electrically connected to charger 232. Charger 232 may be consistent with any charger disclosed as part of this disclosure. Coupling mechanism has an enabled state wherein it electrically connects charging connector 204 to charger 232. Coupling mechanism has a disabled state wherein it does not electrically connect charging connector 204 to charger 232.

Figure 3:
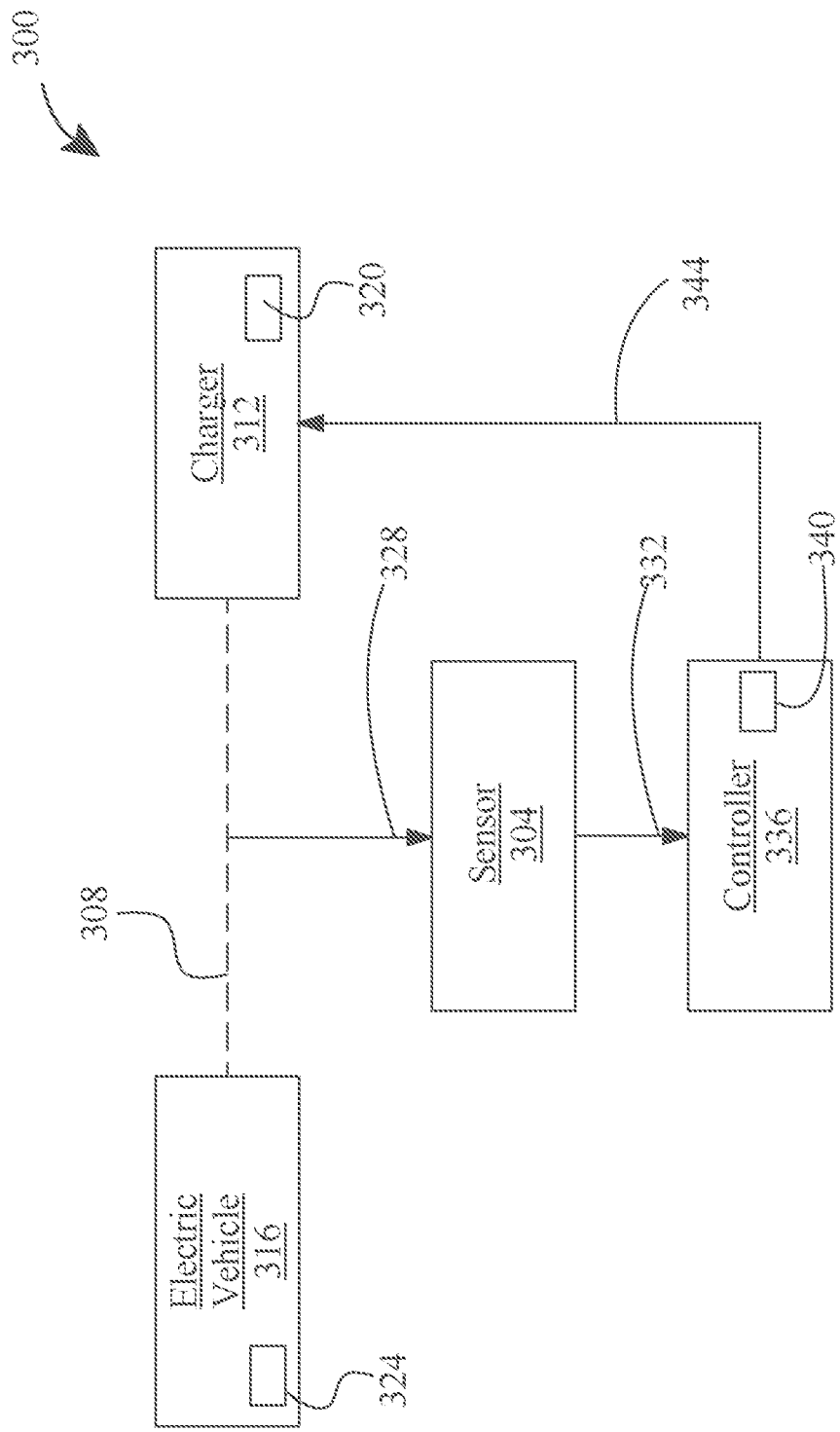
FIG. 3 is a block diagram of an embodiment of an adaptive electric vehicle charging system.

Referring now to FIG. 3, a block diagram illustrating an exemplary embodiment of an adaptive electric vehicle charging system 300 is shown in accordance with one or more embodiments of the present disclosure. In one or more embodiments, system 300 includes a sensor 304 communicatively connected to a charging connection 308 between a charger 312 and an electric vehicle 316. For example, and without limitation, sensor 304 may be communicatively connected to a charging connection 308 between a charger power source 320 of charger 312 and a vehicle power source 324 of electric vehicle 316. In one or more non-limiting exemplary embodiments, sensor 304 may be attached to charger 312. For example, and without limitation, sensor 304 may be attached to a charger power source 320 of charger 312. In other exemplary embodiments, sensor 304 may be attached to electric vehicle 316. For example, and without limitation, sensor 304 may be attached to a vehicle power source 324 of electric vehicle. In other exemplary embodiments, sensor 304 may be remote to both charger 312 and electric vehicle 316. For example, and without limitation, sensor 304 may be attached to a relay or switch of charging connection 308 between charger 312 and electric vehicle 316.

Still referring to FIG. 3, in one or more embodiments, sensor 304 is configured to detect a vehicle characteristic 328 of electric vehicle 316. For the purposes of this disclosure, a "vehicle characteristic" is a detectable phenomenon associated with a level of operation of an electric vehicle and/or an electric vehicle power source. For instance, vehicle characteristic 328 may include temperature, current, voltage, pressure, moisture, any combination thereof, or the like, of an electric vehicle and/or a power source of the electric vehicle. For example, and without limitation, vehicle characteristic may include an electric vehicle type, a voltage of a power source of electric vehicle, a current of power source of electric vehicle, a temperature of power source of electric vehicle, a moisture level of power source of electric vehicle, any combination thereof, or the like, as discussed further below in this disclosure. For the purposes of this disclosure, a "power source" may refer to a device and/or component used to store and provide electrical energy to an electric vehicle and/or electric vehicle subsystems. For example, and without limitation, vehicle power source 324 of electric vehicle 316 may be a battery and/or a battery pack having one or more battery modules or battery cells. In one or more embodiments, vehicle power source 324 may be one or more various types of batteries, such as a pouch cell battery, stack batteries, prismatic battery, lithium-ion cells, or the like. In one or more embodiments, vehicle power source 324 may include a battery, flywheel, rechargeable battery, flow battery, glass battery, lithium-ion battery, ultrabattery, and the like thereof.

With continued reference to FIG. 3, sensor 304 is configured to generate a vehicle datum 332 as a function of vehicle characteristic 328. For the purposes of this disclosure, a "vehicle datum" is an electronic signal representing an element of data and/or parameter correlated to a vehicle characteristic. For example, and without limitation, sensor 304 may detect a voltage of a battery module of vehicle power source 324 and generate an electronic output signal having information, such as a numerical value in volts (V), describing the detected voltage. In one or more embodiments, sensor 304 may be configured to transmit vehicle datum 332 to a controller 136 of system 300. For instance, and without limitation, a power source may need to be a certain temperature to operate properly; vehicle datum 332 may provide a numerical value, such as temperature in degrees, that indicates the current temperature of vehicle power source 324. For example, and without limitation, sensor 304 may be a temperature sensor that detects the temperature of vehicle power source 324 to be at a numerical value of 70° F. and transmits the corresponding vehicle datum to, for example, controller 336. In another example, and without limitation, sensor 304 may be a current sensor and a voltage sensor that detects a current value and a voltage value, respectively, of vehicle power source 324 and generates output signals representing the detected characteristics.

With continued reference to FIG. 3, sensor 304 may include sensors configured to measure physical and/or electrical parameters and/or phenomenon, such as, and without limitation, temperature and/or voltage, of vehicle power source 324, to assist in autonomous or semi-autonomous operations of system 300. For example, and without limitation, sensor 304 may detect voltage and/or temperature of battery modules and/or cells of vehicle power source 324. Sensor 304 may be configured to detect a state of charge within each battery module, for instance and without limitation, as a function of and/or using detected physical and/or electrical parameters. In one or more embodiments, sensor 304 may include a plurality of sensors. Sensor 304 may include, but is not limited to, an electrical sensor, an imaging sensor, such as a camera or infrared sensor, a motion sensor, a radio frequency sensor, a light detection and ranging (LIDAR) sensor, an orientation sensor, a temperature sensor, a humidity sensor, or the like, as discussed further below in this disclosure. As used in this disclosure, a "sensor" is a device that is configured to detect an input and/or a phenomenon and transmit information related to the detection. In one or more embodiments, the information may be transmitted in the form of an output sensor signal, as previously mentioned above in this disclosure. For example, and without limitation, a sensor may transduce a detected phenomenon, such as and without limitation, temperature, voltage, current, pressure, and the like, into a sensed signal. In one or more embodiments, sensor 304 may detect a plurality of data about electric vehicle 316 and/or vehicle power source 324. A plurality of data about vehicle power source 324 may include, but is not limited to, battery quality, battery life cycle, remaining battery capacity, current, voltage, pressure, temperature, moisture level, and the like. In one or more embodiments, and without limitation, sensor 304 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 304 may be a contact or a non-contact sensor. For example, and without limitation, sensor 304 may be connected to electric vehicle 316 and/or a component of vehicle power source 324. In other embodiments, sensor 304 may be remote to vehicle power source 324. Sensor 304 may be communicatively connected to controller 336, as discussed further in this disclosure. Controller 336 may include a computing device, processor, pilot control, control circuit, and/or flight controller so that sensor 304 may transmit/receive signals to/from controller 336, respectively. Signals may include electrical, electromagnetic, visual, audio, radio waves, or another undisclosed signal type alone or in combination.

In one or more embodiments, sensor 304 may include a plurality of independent sensors, where any number of the described sensors may be used to detect any number of physical or electrical quantities associated with vehicle power source 324. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 304 to detect phenomenon may be maintained.

Still referring to FIG. 3, sensor 304 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 304 may include, torque sensor, gyroscope, accelerometer, torque sensor, magnetometer, inertial measurement unit (IMU), pressure sensor, force sensor, proximity sensor, displacement sensor, vibration sensor, among others.

In some embodiments, sensor 304 may include a pressure sensor. "Pressure", for the purposes of this disclosure, and as would be appreciated by someone of ordinary skill in the art, is a measure of force required to stop a fluid from expanding and is usually stated in terms of force per unit area. The pressure sensor that may be included in sensor 304 may be configured to measure an atmospheric pressure and/or a change of atmospheric pressure. In some embodiments, pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, pressor sensor may include a barometer. In some embodiments, pressure sensor may be used to indirectly measure fluid flow, speed, water level, and altitude. In some embodiments, pressure sensor may be configured to transform a pressure into an analogue electrical signal. In some embodiments, pressure sensor may be configured to transform a pressure into a digital signal.

In one or more embodiments, sensor 304 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

In one or more embodiments, sensor 304 may include electrical sensors. An electrical sensor may be configured to measure voltage across a component, electrical current through a component, and resistance of a component. In one or more embodiments, sensor 304 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 304, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

In one or more embodiments, sensor 304 may include a sensor suite which may include a plurality of sensors that may detect similar or unique phenomena. For example, in a non-limiting embodiment, sensor suite may include a plurality of voltmeters or a mixture of voltmeters and thermocouples. System 300 may include a plurality of sensors in the form of individual sensors or a sensor suite working in tandem or individually. A sensor suite may include a plurality of independent sensors, as described previously in this disclosure, where any number of the described sensors may be used to detect any number of physical or electrical quantities associated with an electric vehicle. Independent sensors may include separate sensors measuring physical or electrical quantities that may be powered by and/or in communication with circuits independently, where each may signal sensor output to a control circuit, such as controller 336. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

In one or more embodiments, sensor 304 may include a sense board. A sense board may have at least a portion of a circuit board that includes one or more sensors configured to, for example, measure a temperature of vehicle power source 324. In one or more embodiments, sense board may be connected to one or more battery modules or cells of vehicle power source 324. In one or more embodiments, sense board may include one or more circuits and/or circuit elements, including, for example, a printed circuit board component. Sense board may include, without limitation, a control circuit configured to perform and/or direct any actions performed by the sense board and/or any other component and/or element described in this disclosure. A control circuit of sense board may include any analog or digital control circuit, including and without limitation, a combinational and/or synchronous logic circuit, a processor, microprocessor, microcontroller, or the like.

Still referring to FIG. 3, controller 336 is communicatively connected to sensor 304 and configured to receive vehicle datum 332 from sensor 304. In one or more embodiments, controller 336 may be electrically, mechanically, and/or communicatively connected to sensor 304. Controller 336 is configured to receive information and/or data detected by sensor 304 regarding electric vehicle 316. Sensor signal output, such as vehicle datum 332, from sensor 304 or any other component present within system 300 may be analog or digital. Onboard or remotely located processors can convert those output signals from sensor 304 or sensor suite to a usable form by the destination of those signals, such as controller 336. The usable form of output signals from sensors, through processor may be either digital, analog, a combination thereof, or an otherwise unstated form. Processing may be configured to trim, offset, or otherwise compensate the outputs of sensor suite. Based on sensor output, the processor can determine the output to send to downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

Still referring to FIG. 3, controller 336 may also be configured to determine a compatibility element 340 of electric vehicle 316 as a function of vehicle datum from sensor 304. For the purposes of this disclosure, a "compatibility element" is an element of information regarding an operational state of an electric vehicle and/or a component of the electric vehicle, such as an electric vehicle power source. For instance, and without limitation, a compatibility element 340 may include an operational state of a power source, such as vehicle power source 324. In one or more embodiments, compatibility element may include a charging state of electric vehicle 316. For example, and without limitation, compatibility element may include a state of charge (SoC) or a depth of discharge (DoD) of vehicle power source 324. In one or more embodiments, a charging state may include, for example, a temperature state, a state of charge, a moisture-level state, a state of health (or depth of discharge), or the like. For the purposes of this disclosure, a "charging state" is a power source input and/or an operational condition used to determine a charging protocol for an electric vehicle and/or a power source. For instance, and without limitations, charging states may include ratings and/or tolerances of vehicle power source 324. For example, compatibility element may indicate if a power source of an electric vehicle can tolerate being overcharged. In another example, and without limitation, a charging state may include a voltage at which the power source is designed to operate at, such as a voltage rating. In another example, and without limitation, the charging state may include the current consumption at a specific voltage of a power source. In another example, and without limitation, a charging state may include a charging rate. In another example, and without limitation, a charging state may include a charging rate range.

Still referring to FIG. 3, controller 336 is configured to generate an operating state command 344 to charger 312 that transmits electrical power from charger 312 to the electrical vehicle. In one or more embodiments, an "operating state command" is a signal transmitted by a controller providing actuation instructions to a charger. For instance, and without limitation, operating state command 344 may include instructions to charger 312, which results in charger 312 performing in at specified operating state in response. For example, and without limitation, in response to receiving operating state command 344, charger 312 may increase a voltage output being generated and transmitted to, for example, power source 120. In one or more embodiments, operating state command 344 may be a digital or analog signal, which is transmitted to charger 312 wirelessly or through a wired connection. In one or more embodiments, operating state command 344 is a function of compatibility element 340. For instance, and without limitation, a compatibility element 340 may include a voltage rating for vehicle power source 324 to charge properly without, for example, overheating. The voltage rating may then be processed to generate an operating state command, which includes instructions to charger 312 to provide electrical power to vehicle power source 324 that include a parameter of a voltage level that falls within the voltage rating. For example, and without limitation, power source 120 may have a voltage rating of 24 V, which is determined by controller 336, and controller 336 may generate an operating state command 344 that instructs charger 312 to produce a charge that includes a 24 V voltage. Operating state command 344 may be generated by controller 336 and received by charger 312, which results in an actuation of charger 312. For example, and without limitation, operating state command 344 may actuate charger power source 320 so that charger power source 320 operates at a specific operating state. For example, and without limitation, controller 336 may be configured to initiate a transmission of an electrical power from charger 312 to electric vehicle 316 via charging connection 308, where the transmission includes physical and/or electrical parameters designated by operating state command 344. For the purposes of this disclosure, an "operating state" is a charger output and/or a charging protocol. For instance, an operating state may include a specific charging rate, a voltage level, a current level, and the like. In one or more embodiments, controller 336 may be configured to adjust the operating state, such as electrical power. For example, and without limitation, operating state of a charger, such as a transmitted voltage to vehicle power source 324, may be continuously adjusted as a function of continuously updating compatibility element 340. In one or more embodiments, during charging, controller 336 may adjust the output voltage proportionally with current to compensate for impedance in the wires. Charge may be regulated using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Still referring to FIG. 3, controller 336 may be further configured to train a charging machine-learning model using operating state training data, where the operating state training data comprising a plurality of inputs containing compatibility elements correlated with a plurality of outputs containing operating state elements and generate the operating state as a function of the operating state machine-learning model.

Still referring to FIG. 3, controller 336 may be a computing device, a flight controller, a processor, a control circuit, and the like. In one or more embodiments, controller 336 may include a processor that executes instructions provided by for example, a user input, and receives sensor output such as, for example, vehicle datum 332. For example, controller 336 may be configured to receive an input, such as a user input, regarding information of various types of electric vehicles and/or electric vehicle power source types. In other embodiments, controller 336 may retrieve such information from an electric vehicle database stored in, for example, a memory of controller 336 or another computing device. In some cases, charger 312 may allow for verification that performance of charger 312 is within specified limits. As used in this disclosure, "verification" is a process of ensuring that which is being "verified" complies with certain constraints, for example without limitation system requirements, regulations, and the like. In some cases, verification may include comparing a product, such as without limitation charging or cooling performance metrics, against one or more acceptance criteria. For example, in some cases, charging metrics, may be required to function according to prescribed constraints or specification. Ensuring that charging or cooling performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for controller 336. In some cases, some or all verification processes may be performed by controller 336. In some cases, at least a machine-learning process, for example a machine-learning model, may be used to verify. Controller 336 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Still referring to FIG. 3, controller 336 is configured to determine a compatibility element 340 as a function of vehicle datum 332, as previously discussed in this disclosure. In other embodiments, controller may also be configured to determine compatibility element 340 as a function of vehicle datum 332 and charger capability datum. For the purposes of this disclosure, a "charger capability datum" is an element of information regarding an operational ability of a charger and/or a power source of the charger, such as charger power source 320 of charger 312. For example, charger capability datum may include a power rating, a charge range, a charge current, or the like. In one or more non-limiting exemplary embodiments, charger power source 320 may have a continuous power rating of at least 350 kVA. In other embodiments, charger power source 320 may have a continuous power rating of over 350 kVA. In some embodiments, charger power source 320 may have a battery charge range up to 950 Vdc. In other embodiments, charger power source 320 may have a battery charge range of over 950 Vdc. In some embodiments, charger power source 320 may have a continuous charge current of at least 350 amps. In other embodiments, charger power source 320 may have a continuous charge current of over 350 amps. In some embodiments, charger power source 320 may have a boost charge current of at least 500 amps. In other embodiments, charger power source 320 may have a boost charge current of over 500 amps. In some embodiments, charger power source 320 may include any component with the capability of recharging an energy source of an electric vehicle. In some embodiments, charger power source 320 may include a constant voltage charger, a constant current charger, a taper current charger, a pulsed current charger, a negative pulse charger, an IUI charger, a trickle charger, and a float charger. Controller 336 may be consistent with any controller described as part of this disclosure.

Still referring to FIG. 3, in some embodiments, charger 312 may include the ability to provide an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some embodiments, charger power source 320 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charger power source 320 may provide power to the grid power component. In this configuration, charger power source 320 may provide power to a surrounding electrical power grid. In one or more embodiments, though controller 336 may determine a charger capability element as a function of sensor datum, controller 336 may also obtain charger capability element from, for example, a database. "charger capability element" is an element of information regarding the capability of charger 312 to supply a specific type of power. For example, and without limitation, charger 312 may include identification information that is inputted, for example, by a user or manufacturer, so that when controller 336 is communicatively connected to charger 312, charger may transmit stored charger capability information to controller 336. Charger 312 may be consistent with any charger described as part of this disclosure.

In one or more embodiments, sensor 304 may be further configured to detect a charger capability characteristic of charger 312 and generate a charger capability datum as a function of the charger capability characteristic. For the purpose of this disclosure, a "charger capability characteristic" is a detectable phenomenon associated with a level of operation of a charger and/or a charger power source. For instance, charger capability characteristic may include a current and/or present-time measured value of current, voltage, temperature, pressure, moisture, any combination thereof, or the like. Controller 336 may then be configured to determine a charger capability element of charger 312 as a function of charger capability datum from sensor 304. In one or more embodiments, controller 336 may be configured to generate an operating state command 344 as a function of compatibility element 340 and charger capability element, as discussed further below in this disclosure. For instance, and without limitation, controller 336 may be configured to train a charging machine-learning model using operating state training data, the operating state training data including a plurality of inputs containing compatibility elements and charger capability elements correlated with a plurality of outputs containing operating state elements, and thus generate operating state command 344 as a function of the charging machine-learning model; such training data may be recorded by entry of data from tests of batteries and/or aircraft to determine such correlations. For example, and without limitation, operating state command 344 may include a current level, where operating state command 344 may provide instructions to charger 312 to produce an electric transmission that includes the current level of operating state command 344 and transmit the electrical transmission from electrical charger 312 to vehicle power source 324 for the purposes of charging vehicle power source 324 at a current level adapted to suit vehicle power source 324.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 3, controller 336 may be further configured to train a parameter machine-learning model using parameter training data, the parameter training data comprising a plurality of inputs containing compatibility elements correlated with a plurality of outputs containing charger capability elements; and generate the parameter as a function of the parameter machine-learning model.

Still referring to FIG. 3, as previously mentioned in this disclosure, system 300 may include a computing device. Computing device may include any computing device as described in this disclosure, including without limitation a microcontroller, processor, microprocessor, flight controller, digital signal processor (DSP), and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
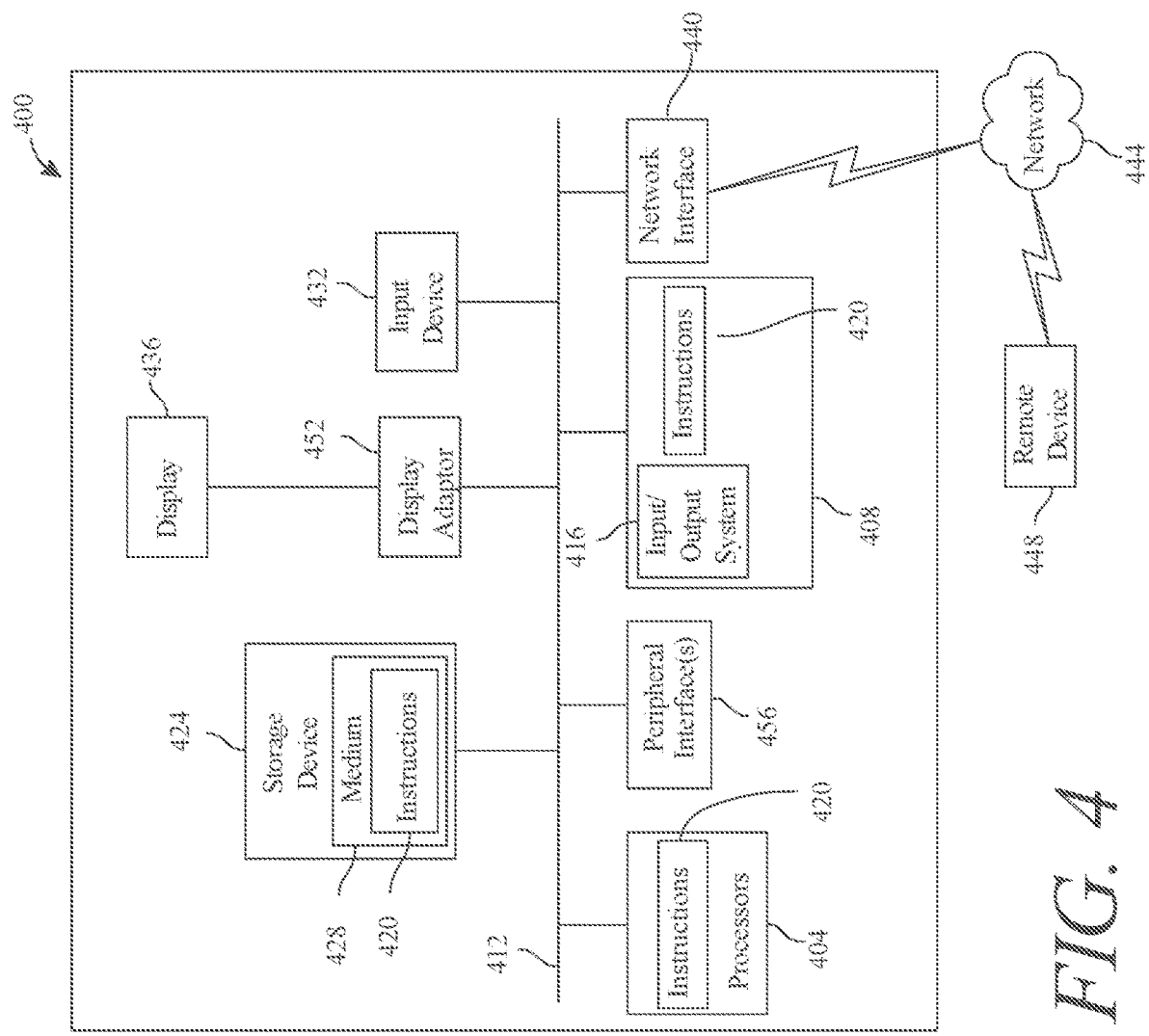
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

Figure 5:
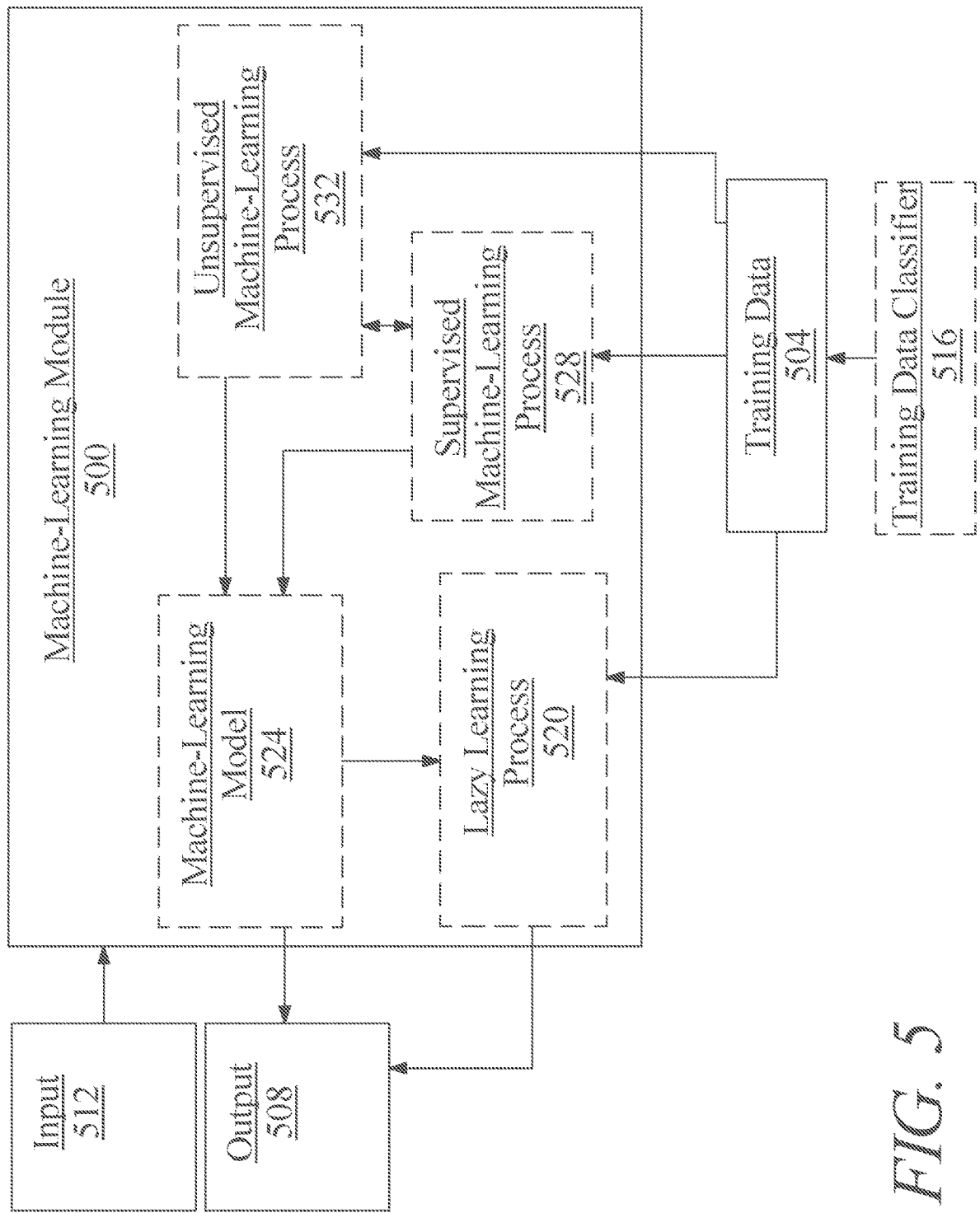
FIG. 5 is a block diagram of an exemplary machine learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Referring now to FIG. 6, a method for an electric vehicle charging connector 600 is depicted as a flow chart. Method 600 includes a step 605 of detecting whether a charging connector is coupled to an electric vehicle. Charging connector may be consistent with any charging connector discussed as part of this disclosure. Method 600 further includes a step 610 of enabling a flow of electricity from the charging connector to the electric vehicle if the charging plug is coupled to the electric vehicle using a coupling mechanism. Coupling mechanism may be consistent with any coupling mechanism discussed as part of this disclosure. Additionally, method 600 includes a step 615 of disabling the flow of electricity from the charging connector to the electric vehicle if the charging plug is not coupled to the electric vehicle using the coupling mechanism. In some embodiments, the coupling mechanism may be an interlock device. Interlock device may be consistent with any interlock device discussed as part of this disclosure. In some embodiments, the coupling mechanism may be a relay. Relay may be consistent with any relay discussed as part of this disclosure.

With continued reference to FIG. 6, method 600 may further include a step of detecting a coupling datum using a sensor communicatively connected to the charging connector. Coupling datum may be consistent with any coupling datum discussed as part of this disclosure. The sensor may be consistent with any sensor discussed as part of this disclosure. In some embodiments, method 600 may include a step of generating a command for the coupling mechanism to enable the flow of electricity from the charging connector to the electric vehicle as a function of the coupling datum, using a controller communicatively connected to the sensor. In some embodiments, method 600 may also include a step of generating a command for the coupling mechanism to disable the flow of electricity from the charging connector to the electric vehicle as a function of the coupling datum, using the controller.

With continued reference to FIG. 6, method 600 may include, in some embodiments, a step of detecting a vehicle characteristic of the electric vehicle using a sensor communicatively connected to the charging connector. Vehicle characteristic may be any vehicle characteristic discussed as part of this disclosure. In some embodiments, method 600 may include a step of generating a vehicle datum as a function of the vehicle characteristic. Vehicle datum may be consistent with any vehicle datum disclosed as part of this disclosure. In some embodiments, method 600 may include a step of determining a compatibility element of the electric vehicle as a function of the vehicle datum using a controller communicatively connected to the sensor. Compatibility element may be consistent with any compatibility element previously discussed as part of this disclosure. Method 600 may include a further step, in some embodiments, of generating an operating state command that transmits specific electrical power from the charger to the electric vehicle, wherein the operating state command is a function of the compatibility element using the controller. Operating state command may be consistent with any operating state command discussed as part of this disclosure. In some embodiments, method 600 may include a step of determining a charger capability element of the charger as a function of the charger capability datum from the sensor using the controller. Charger capability element may be consistent with any charger capability element disclosed as part of this disclosure. Additionally, in some embodiments, method 600 may include a further step of generating the operating state command as a function of the compatibility element. and the charger capability element using the controller. In some cases, the electric vehicle in method 600 may be an electric aircraft.

With continued reference to FIG. 6, method 600, in some embodiments, may include a step of detecting a charger capability characteristic of a charger using the sensor. Charger capability characteristic may be consistent with any charger capability characteristic discussed as part of this disclosure. Additionally, charger may be consistent with any charger discussed as part of this disclosure. In some embodiments, method 600 may further include a step of generating a charger capability datum as a function of the charger capability characteristic. Charger capability datum may be consistent with any charger capability datum discussed as part of this disclosure.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric vehicle charging connector, comprising:
   a charging connector, the charging connector comprising:
      a direct current pin;
      an alternating current pin; and
      a locking mechanism configured to keep the charging connector engaged with a charging port;
   a coupling mechanism with an enabled state and a disenabled state, wherein the coupling mechanism comprises a solid state relay, wherein the coupling mechanism is configured to:
      couple the charging connector to an electric vehicle;
      enable a flow of electricity from the charging connector to the electric vehicle when the charging connector becomes coupled to the electric vehicle; and
      disable the flow of electricity from the charging connector to the electric vehicle when the charging connector becomes uncoupled from the electric vehicle, wherein the charging connecter is mated, by the coupling mechanism to a charger comprising a ventilation ducting system, wherein the coupling mechanism is configured to disable the flow of electricity from the charging connector to the electric vehicle in response to failure of a exhaust device of the ventilation ducting system causing overheating of the charger.

2. The electric vehicle charging connector of claim 1, wherein the coupling mechanism comprises an interlock device.

3. The electric vehicle charging connector of claim 1, further comprising:
   a sensor, the sensor communicatively connected to the charging connector, the sensor configured to detect a coupling datum; and
   a controller, the controller communicatively connected to the sensor, the controller configured to:
      receive a coupling datum from the sensor;
      generate a command for the coupling mechanism to enable the flow of electricity from the charging connector to the electric vehicle as a function of the coupling datum.

4. The electric vehicle charging connector of claim 3, wherein the controller is further configured to generate a command for the coupling mechanism to disable the flow of electricity from the charging connector to the electric vehicle as a function of the coupling datum.

5. The electric vehicle charging connector of claim 3, where in the sensor is a contact sensor.

6. The electric vehicle charging connector of claim 3, wherein the sensor is an electric sensor.

7. The electric vehicle charging connector of claim 1, further comprising:
   a sensor communicatively connected to the charging connector, the sensor configured to:
      detect a vehicle characteristic of the electric vehicle; and
      generate a vehicle datum as a function of the vehicle characteristic; and
   a controller communicatively connected to the sensor, the controller configured to:
      receive the vehicle datum from the sensor;
      determine a compatibility element of the electric vehicle as a function of the vehicle datum; and
      generate an operating state command that transmits specific electrical power from a charger to the electric vehicle, wherein the operating state command is a function of the compatibility element.

8. The electric vehicle charging connector of claim 7 wherein the sensor is further configured to:
   detect a charger capability characteristic of a charger; and
   generate a charger capability datum as a function of the charger capability characteristic.

9. The electric vehicle charging connector of claim 8, wherein the controller is further configured to:
   determine a charger capability element of the charger as a function of the charger capability datum from the sensor; and
   generate the operating state command as a function of the compatibility element, and the charger capability element.

10. The electric vehicle charging connector of claim 1, wherein the electric vehicle is an electric airplane.

11. A method for an electric vehicle charging connector, comprising:
    detecting whether a charging connector is coupled to an electric vehicle, wherein a locking mechanism is configured to keep the charging connector engaged with a charging port of the electric vehicle, wherein the coupling mechanism comprises a solid state relay;
    enabling a flow of electricity from the charging connector to the electric vehicle if the charging connector is coupled to the electric vehicle using a coupling mechanism; and
    disabling the flow of electricity from the charging connector to the electric vehicle if the charging connector is not coupled to the electric vehicle using the coupling mechanism, wherein the charging connecter is mated, by the coupling mechanism to a charger comprising a ventilation ducting system, wherein the coupling mechanism is configured to disable the flow of electricity from the charging connector to the electric vehicle in response to failure of a exhaust device of the ventilation ducting system causing overheating of the charger.

12. The method for an electric vehicle charging connector of claim 11, wherein the coupling mechanism is an interlock device.

13. The method for an electric vehicle charging connector of claim 11, further comprising:
    detecting a coupling datum using a sensor communicatively connected to the charging connector; and
    generating a command for the coupling mechanism to enable the flow of electricity from the charging connector to the electric vehicle as a function of the coupling datum, using a controller communicatively connected to the sensor.

14. The method for an electric vehicle charging connector of claim 13, further comprising generating a command for the coupling mechanism to disable the flow of electricity from the charging connector to the electric vehicle as a function of the coupling datum, using the controller.

15. The method for an electric vehicle charging connector of claim 11, further comprising:
   detecting a vehicle characteristic of the electric vehicle using a sensor communicatively connected to the charging connector;
   generating a vehicle datum as a function of the vehicle characteristic;
   determining a compatibility element of the electric vehicle as a function of the vehicle datum using a controller communicatively connected to the sensor;
   generating an operating state command that transmits specific electrical power from the charger to the electric vehicle, wherein the operating state command is a function of the compatibility element using the controller.

16. The method for an electric vehicle charging connector of claim 15, further comprising:
   detecting a charger capability characteristic of a charger using the sensor; and
   generating a charger capability datum as a function of the charger capability characteristic.

17. The method for an electric vehicle charging connector of claim 16, further comprising:
   determining a charger capability element of the charger as a function of the charger capability datum from the sensor using the controller; and
   generating the operating state command as a function of the compatibility element, and the charger capability element using the controller.

18. The method for an electric vehicle charging connector of claim 11, wherein the electric vehicle is an electric aircraft.

19. The electric vehicle charging connector of claim 1, wherein the charging connector further comprising a ground pin, the ground pin configured to provide a floating ground.

20. The method for an electric vehicle charging connector of claim 11, wherein the charging connector further comprising a ground pin, the ground pin configured to provide a floating ground.

* * * * *